US011565681B2

(12) United States Patent
Dombek et al.

(10) Patent No.: US 11,565,681 B2
(45) Date of Patent: Jan. 31, 2023

(54) METHOD FOR TESTING A PRESSURE-MEDIUM-OPERATED ELECTRONIC BRAKE SYSTEM

(71) Applicant: WABCO GmbH, Hannover (DE)

(72) Inventors: Dominika Dombek, Hannover (DE); Thilo Klostermann, Hannover (DE); Jann Löll, Jever (DE); Jakob Friedrich Schmidt, Hannover (DE)

(73) Assignee: WABCO GmbH, Hannover (DE)

( * ) Notice: Subject to any disclaimer, the term of this patent is extended or adjusted under 35 U.S.C. 154(b) by 584 days.

(21) Appl. No.: 16/674,331

(22) Filed: Nov. 5, 2019

(65) Prior Publication Data
US 2020/0139953 A1 May 7, 2020

(30) Foreign Application Priority Data
Nov. 7, 2018 (DE) ...................... 10 2018 127 813.6

(51) Int. Cl.
*B60T 17/22* (2006.01)
(52) U.S. Cl.
CPC ......... *B60T 17/221* (2013.01); *B60T 2220/04* (2013.01); *B60T 2240/00* (2013.01); *B60T 2250/04* (2013.01); *B60T 2270/413* (2013.01)
(58) Field of Classification Search
CPC ............. B60T 17/221; B60T 2270/413; B60T 2220/04; B60T 2240/00; B60T 2250/04; B60T 8/1708; B60T 8/171; B60T 11/108; B60T 13/581; B60T 15/027; B60T 15/028; B60T 8/32; B60T 8/323
See application file for complete search history.

(56) References Cited

U.S. PATENT DOCUMENTS

| 9,327,694 | B2* | 5/2016 | Klostermann | .......... B60T 8/171 |
| 10,933,852 | B2* | 3/2021 | Goers | .................... B60T 15/028 |
| 2014/0318209 | A1* | 10/2014 | Reimann | .................. B60R 21/01 73/1.01 |
| 2015/0239441 | A1* | 8/2015 | Klostermann | ........ B60T 13/581 303/7 |
| 2019/0248346 | A1* | 8/2019 | Wulf | ..................... B60T 13/263 |

FOREIGN PATENT DOCUMENTS

| DE | 10 2012 000 435 A1 | 7/2013 |
| DE | 10 2014 002 614 A1 | 8/2015 |

* cited by examiner

*Primary Examiner* — Pamela Rodriguez
(74) *Attorney, Agent, or Firm* — Dickinson Wright PLLC

(57) ABSTRACT

A method for testing a pressure-medium-operated electronic brake system of a vehicle having a valve and sensor device including a control pressure inlet, a control pressure outlet, a plurality of valves selected from electrically activated inlet valves, outlet valves, redundancy valves, and pressure valves, an actual pressure sensor for measuring an actual control pressure, a setpoint pressure sensor for measuring a setpoint control pressure, and an electronic control unit, which has a signal-conducting connection to the electrically activated valves and pressure sensors, for receiving pressure signals and actuating the electrically activated valves, includes testing the setpoint pressure sensor while the control unit is in a passive operating mode, passing the setpoint control pressure directly through to the control pressure outlet, measuring the actual pressure at the control pressure outlet using a sensor, and transmitting the measured value to the control unit for plausibility checking against the setpoint pressure measurement.

11 Claims, 3 Drawing Sheets

METHOD FOR TESTING A PRESSURE-MEDIUM-OPERATED ELECTRONIC BRAKE SYSTEM

FIELD OF INVENTION

The invention relates to a method for functionally testing a pressure-medium-operated electronic brake system of a vehicle.

BACKGROUND

Electronically controlled brake systems, which are operated with hydraulic and/or pneumatic pressure media, are generally known in vehicles, for example in utility vehicles with a trailer. The regulation of the brakes on such vehicles is usually performed by an electronic control unit which controls the brake system of the vehicle and, if appropriate, of a trailer vehicle. In order to implement all the required functions of such a brake system a multiplicity of valves and sensors are necessary. In order to initiate braking operations, these brake systems have one or more control pressure lines by means of which a control pressure, which corresponds to the braking request of the driver, is applied by a brake pedal unit or other control device and transmitted to, for example, the brake systems of the utility vehicle and/or to a trailer control valve of a trailer. In this context, the requested control pressure is usually initially registered by a setpoint pressure sensor and fed to a corresponding signal receiver of the electronic control unit.

Although the driver's request can be converted directly into a braking operation of the vehicle, the driver usually only influences the wheel brakes indirectly in the case of electronic brake systems. As a result, a largely electronic regulating process of the brake power is made possible by driver assistance systems such as an antilock braking system or a startup control system. In particular, this electronic regulation permits precise setting of the braking power in order to bring about an effective braking operation of the vehicle, which is respectively adapted to the situation. The control pressure signal, which is fed to the electronic control unit by the setpoint pressure sensor, is here an important input variable for the further regulation of the brake system.

If a pneumatic setpoint pressure sensor of an electronic brake system, which registers the driver braking request pressure, supplies an excessively low measured value owing to a malfunction of the sensor or of the electronic control unit, the control pressure or brake pressure which is applied by the control unit will possibly be too low, with the result that the trailer vehicle is not braked as desired. On the other hand, if this sensor signals an excessively high setpoint pressure, the resulting control pressure will possibly be too high, and there is the risk of the trailer vehicle being possibly unintentionally braked hard. Therefore, such brake systems are intended to satisfy safety integrity levels, such as Safety Integrity Level (SIL), Automotive Safety Integrity Level (ASIL) or Performance Level (PL), which are also defined with respect to future utility vehicles that are controlled in an automated fashion.

In order to ensure a sufficient safety integrity level of electronic pressure control systems of a brake system, for example in the case of an electronic trailer control valve, the sensor measurement of the vehicle driver braking request requires, with respect to faulty signals, a high degree of diagnostic coverage which specifies the ratio of faults detected by means of diagnostic tests to the total failure rate of a component or of a subsystem. In practice, brake systems of the type denoted above function reliably and satisfactorily. However, there is nevertheless a need for further improvement with respect to the safety integrity level.

SUMMARY

Against this background, the object of the invention has been to present a method for functionally testing a pressure-medium-operated electronic brake system of a vehicle, with which a high safety integrity level of the brake system is achieved. In particular, simple and cost-effective functional testing of a setpoint pressure sensor of the brake system is made possible. In addition, the method is suitable to be carried out on a pneumatically and/or hydraulically operated electronic brake system of a utility vehicle.

At least some of the stated objectives are achieved by a method for functionally testing a pressure-medium-operated electronic brake system of a vehicle, wherein the electronic brake system has a valve and sensor device. This valve and sensor device has at least one control pressure inlet, at least one control pressure outlet and a plurality of valves which may include electrically activated inlet valves, outlet valves, redundancy valves or pressure valves. Furthermore, the valve and sensor device has at least one actual pressure sensor for registering and signaling an actual control pressure, as well as at least one setpoint pressure sensor assigned to the valve and sensor device with the purpose of registering and signaling a setpoint control pressure. In addition, an electronic control unit is present, which has a signal-conducting connection to the electrically activated valves and to the pressure sensors for controlling the valves or registering the sensor signals.

According to the method disclosed herein, the setpoint pressure sensor is configured to measure a requested setpoint control pressure at a first control pressure inlet of the valve and sensor device, and to send the measured setpoint control pressure to the electronic control unit as an input signal for the purpose of activating a vehicle brake of the vehicle; the valve and sensor device has a normal operating mode wherein the electronic control unit is configured to actively regulate the actual control pressure at the control pressure outlet in response to the setpoint control pressure; the valve and sensor device has a redundancy mode wherein when the control unit is in a passive operating state, the actual control pressure present at the control pressure outlet is generated directly by the setpoint control pressure present at the first control pressure inlet; the valve and sensor device is configured to be in the redundancy mode or temporarily switched into the redundancy mode during the functional testing of the setpoint pressure sensor; the actual pressure sensor is configured to measure the actual control pressure present at the control pressure outlet and to transmit the actual control pressure as an electronic signal to the electronic control unit; the electronic control unit is configured to subject the actual control pressure measured in the redundancy mode and the setpoint control pressure signaled to the electronic control unit by the setpoint pressure sensor to comparative plausibility checking; and a malfunction of the setpoint pressure sensor is detected, and a fault message is stored or output, on the basis of the plausibility checking.

This method makes it possible to achieve a high safety integrity level of an electronic brake system of the generic type. In particular, a high degree of diagnostic coverage of the brake system can be achieved by applying this method. The correct method of functioning of an individual setpoint pressure sensor can be tested by using an existing pressure sensor in the electronic brake system. An external diagnostic device is not necessary for this, which permits a saving in costs.

One advantageous development of the method is that the switching of the valve and sensor device into the redundancy mode for the purpose of functionally testing the setpoint pressure sensor occurs when the vehicle is in a specified operating state, such as, for example, the "vehicle stationary state" operating state or in the "first braking process after starting" operating state.

Accordingly, the brake system is intended to switch into the redundancy mode under certain conditions, for example in the stationary state, or when there is a first braking operation after the start of the vehicle. In the redundancy mode, the setpoint control pressure is compared with the actual control pressure. For this purpose, in the redundancy mode, when the electronic control unit is not active, the actual pressure sensor monitors the current pressure and detects if the setpoint pressure sensor is not signaling the correct pressure. An incorrectly operating setpoint pressure sensor can be detected, for example, if a control pressure of zero is expected but the setpoint pressure sensor signals a pressure value that is different from zero. An incorrectly operating setpoint pressure sensor can also be detected, for example, if a pressure which is considered to be plausible in the current operating situation is measured by the actual pressure sensor at the control pressure output of the valve and sensor device and the same pressure value or a pressure value which can be derived unambiguously therefrom is expected at the control pressure inlet but the setpoint pressure sensor signals a significantly different pressure value.

The operating states suitable for the functional testing of the setpoint pressure sensor can advantageously be determined using operational data of the vehicle, which are registered or are available on a bus system of the vehicle, such as the vehicle speed, wheel speed, longitudinal acceleration of the vehicle or engaged immobilizing brake.

The method can be applied for advantageously testing the precise functional capability of a setpoint pressure sensor on various brake systems, such as service brake systems or immobilizing brake systems of motor vehicles. In a specific embodiment, the method is carried out on a valve and sensor device embodied as an electronic trailer control valve that actuates a trailer brake system of a trailer vehicle, wherein the pressure control inlet is a redundancy connection of the trailer control valve, and the control pressure outlet is connected to a control pressure coupling head for coupling a brake line of the trailer vehicle.

Accordingly, the integrity and precise functional capability of the setpoint pressure sensor is tested when a braking request for activating a trailer brake is registered. The risk of increased or inadequate braking of the trailer vehicle owing to an incorrect setpoint control pressure signal is therefore detected, and a suitable measure for remedying this defect, for example the replacement of a defective setpoint pressure sensor, can be initiated.

Finally, the invention also relates to a vehicle, such as a utility vehicle as a single vehicle or as a tractor vehicle-trailer vehicle combination, with an electronic brake system, on which the disclosed method can be carried out.

BRIEF DESCRIPTION OF THE DRAWINGS

The invention is explained in more detail below on the basis of an exemplary embodiment illustrated in the appended drawings, in which.

The drawings are provided herewith for purely illustrative purposes and are not drawn to scale or intended to limit the scope of the present invention.

DETAILED DESCRIPTION

Figure 1:
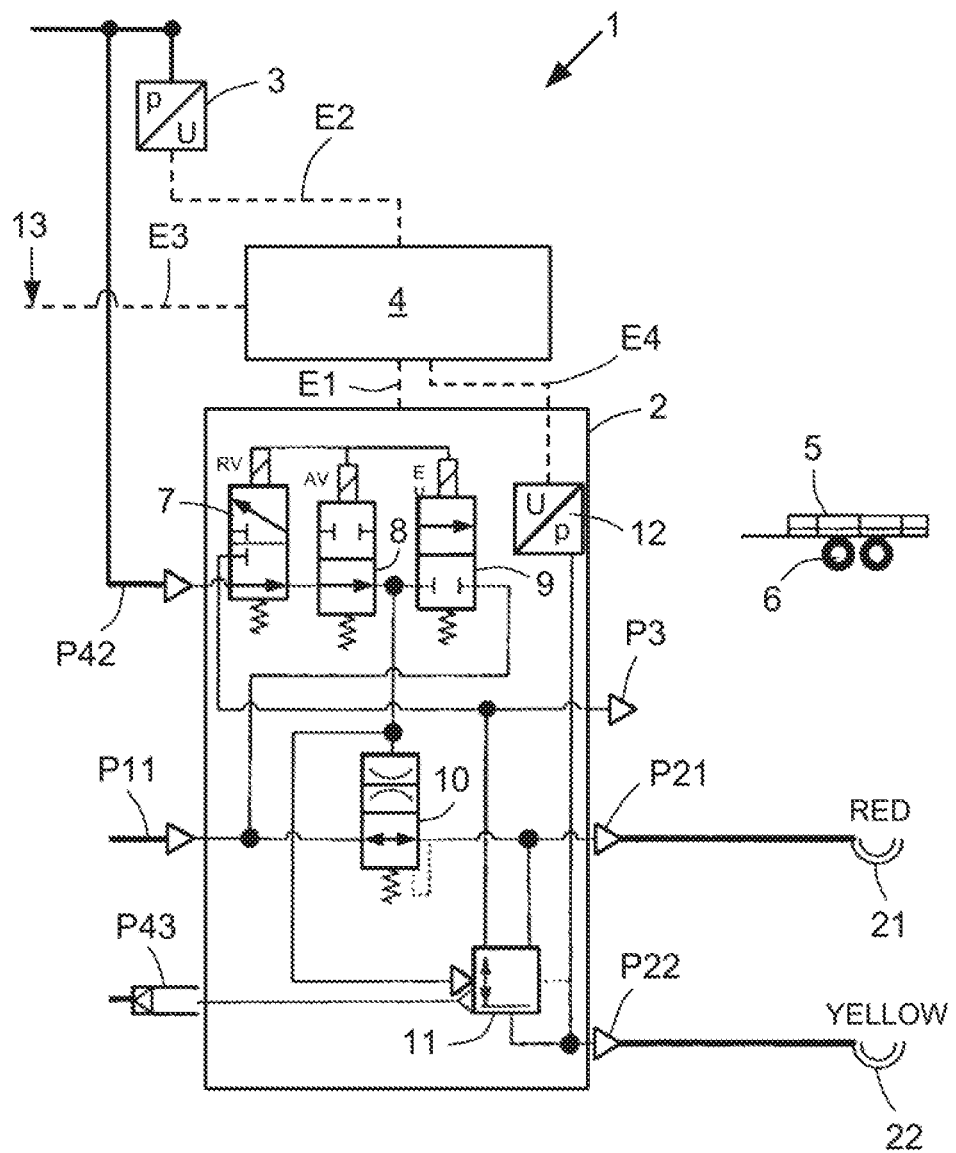
FIG. 1 shows a simplified switching diagram of a valve and sensor device.

FIG. 1 shows part of a brake system 1 such as it can be provided, for example, for a compressed-air-brake agricultural vehicle train composed of a tractor vehicle (not illustrated) and a trailer vehicle 5. The illustration in FIG. 1 and the following description are restricted to the components of such a brake system relevant to the execution of a method according to the invention. The pneumatic connections and lines are provided with reference numbers by analogy with DIN ISO 6786. In order to provide better delineation with respect to the reference numbers of the components, all the reference numbers of the pneumatic lines and connections are provided with a preceding prefix "P", and all the reference numbers of the electrical lines are provided with their preceding prefix "E". For example, the brake system 1 illustrated in FIG. 1 has a valve and sensor device 2 configured as an electro-pneumatic trailer control valve.

An electronic control unit 4 for controlling a trailer brake 6 of the trailer vehicle 5 is assigned to the valve and sensor device 2 and electrically connected thereto. Furthermore, the brake system 1 has a service brake module (not illustrated) for actuating a service brake of the tractor vehicle, as well as an immobilizing brake module (not illustrated) for actuating an immobilizing brake of the tractor vehicle and the trailer vehicle 5. These modules are not significant to the disclosed method, and therefore are not considered further. In this respect, reference is made to German patent applications DE 10 2012 000 435 A1 and DE 10 2014 002 614 A1.

The valve and sensor device 2 corresponds to a known trailer control valve. It has three regulating valves 7, 8, 9, which are electromagnetic directional control valves. The first regulating valve 7 is a 3/2 directional control valve and is configured to be a redundancy valve. The second regulating valve 8 is a 2/2 way valve, and is configured to be an outlet valve. The second regulating valve 8 is connected pneumatically on the input side to the first regulating valve 7. The third regulating valve 9 is also a 2/2 way valve and is configured to be an inlet valve. The third regulating valve 9 is connected pneumatically to the second regulating valve 8 and to the throttle valve 10 on the input side.

These three regulating valves 7, 8, 9 are connected electrically in parallel with one another and are operatively connected to the electronic control unit 4 via a first electrical connecting line E1 which is composed of a plurality of individual connections. The regulating valves 7, 8, 9 are actuated by the electronic control unit 4. The first and second regulating valves 7, 8, that is to say the redundancy valve and the outlet valve, are currentlessly opened by spring force and closed by means of energization of an electromagnet that applies a magnetic force capable of overcoming the spring force. The third regulating valve 9, that is to say the inlet valve, is currentlessly closed by spring force and switched to an open state by energization of an electromagnet that applies a magnetic force capable of overcoming the spring force.

Furthermore, the valve and sensor device 2 has a pressure valve 11, as well as an actual pressure sensor 12 that detects, in particular, the actual pressure at a pneumatic control pressure outlet P22 and transmits the measured actual pressure as a control parameter signal to the electronic control unit 4 via a fourth electrical connection E4.

The valve and sensor device 2 has three pneumatic inlets P11, P42, P43 as well as three pneumatic outlets P3, P21, P22. The supply pressure from a pressure medium accumulator (not illustrated) is passed through the valve and sensor device 2 via a pneumatic connection (not illustrated either) and the pneumatic supply pressure inlet P11, and is directed via a supply pressure output P21 to a supply-pressure coupling head 21 which is marked "RED". The supply-pressure coupling head 21 is coupled to a corresponding coupling head of a supply line (not illustrated) of the trailer brake 6 of the trailer vehicle 5.

The first regulating valve 7 is connected pneumatically directly to the first control pressure inlet P42 which is a pneumatic redundancy pressure inlet. The immobilizing brake module (not illustrated) is connected pneumatically to the second control pressure inlet P43 which is a pneumatic immobilizing pressure inlet. The second control pressure inlet P43 produces a pneumatic connection between the immobilizing brake module (not illustrated) and the mechanical pressure valve 11, which is switched in accordance with the pressure of the valve and sensor device 2. In addition the pressure valve 11 is operatively connected on the input side to the other valves 7, 8, 9, 10 and to the supply pressure inlet P11. The pressure valve 11 is also connected on the output side via a control pressure outlet P22 to a control-pressure coupling head 22 which is marked "YELLOW". A corresponding coupling head of a control pressure line (not illustrated) of the trailer brake 6 is coupled to this control-pressure coupling head 22. The control pressure line (not illustrated) of the trailer brake 6 supplies pressure to the brake cylinders (not illustrated either) of the trailer vehicle 5. Furthermore, the valve and sensor device 2 also has a bleed outlet P3 which is pneumatically connected to the pressure valve 11 and to the first regulating valve 7 which is a redundancy valve.

The electrical and the pneumatic connection of the valves 7, 8, 9, 10, 11 of the valve and sensor device 2 and the resulting operation of the valve and sensor device 2 are known per se and do not have to be described here in particular. The valve and sensor device 2 can be operated optionally in a redundancy mode, to be described in more detail, via the first control pressure inlet P42 which is a pneumatic redundancy pressure inlet.

The second control pressure inlet P43, which is a pneumatic immobilizing pressure inlet, has an inverted switching characteristic. This means that a pressure reduction at control pressure inlet P43 brings about a pressure increase at the control pressure outlet P22, and a pressure increase at the control pressure inlet P43 brings about a pressure reduction at the control pressure outlet P22. The trailer brake 6 is therefore activated, for example, when the control pressure inlet P43 of the valve and sensor device 2 is bled, and it is released when the control pressure inlet P43 of the valve and sensor device 2 is aerated. This is done if the trailer brake 6 is not activated by the service brake in accordance with the control pressure requested at the first control pressure inlet P42 of the service brake system of the vehicle in a normal operating mode, which is to be described below, or in the redundancy mode.

Furthermore, a setpoint pressure sensor 3 is provided in the valve and sensor device 2. The setpoint pressure sensor 3 is pneumatically connected to the first control pressure inlet P42, which is a pneumatic redundancy pressure inlet, and the setpoint pressure sensor 3 is electrically connected to the control unit 4 via a second electrical connecting line E2. The setpoint pressure sensor 3 measures a setpoint control pressure which is dependent on a brake pedal unit or other control device and corresponds to the braking request of the driver. The setpoint pressure sensor converts the pressure value into an electrical signal, which is transmitted to the electronic control unit 4 as an input parameter.

Finally, the electronic control unit 4 is also connected via a third electrical connecting line E3 to a bus system 13 of the vehicle, for example, a CAN. Different parameters of relevant information, such as the vehicle speed, longitudinal acceleration of the vehicle and wheel speed of the wheels, which are driven and are to be braked, are made available to the electronic control unit 4 via the bus system 13.

Figure 2:
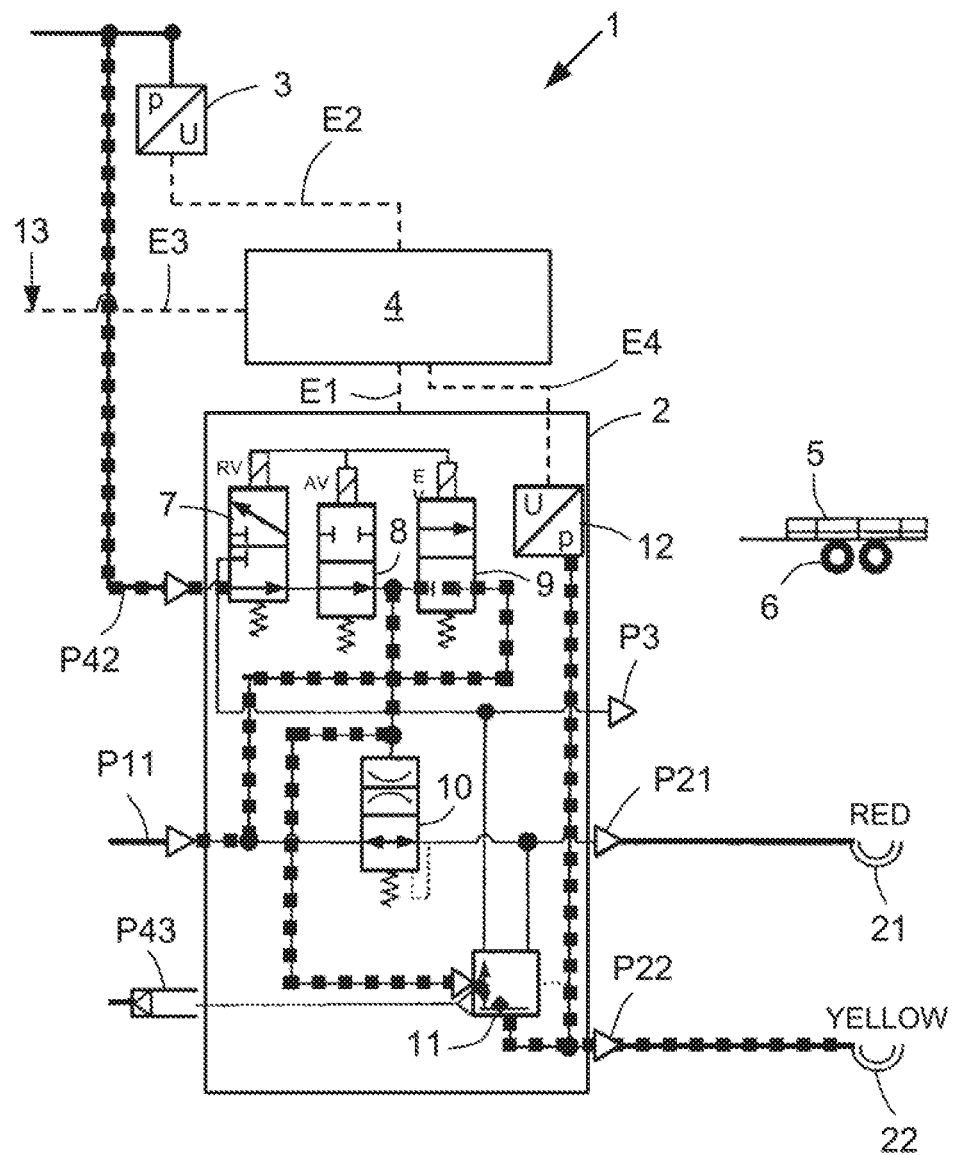
FIG. 2 shows the switching diagram according to FIG. 1 with a control pressure path in a normal operating mode.

FIG. 2 shows the valve and sensor device 2, which is a trailer control valve according to FIG. 1, in a normal operating mode. The pneumatic ports and connections to which the pneumatic pressure medium is applied in the normal operating mode are highlighted therein in the drawings. Accordingly, a braking request pressure prevails at the first control pressure inlet P42. However, this braking request pressure is not passed directly to the valve and sensor device 2, since the first regulating valve 7, that is to say the redundancy valve, is closed in this normal operating mode. The braking request pressure is measured by the setpoint pressure sensor 3 and transmitted as a measured setpoint control pressure value signal to the electronic control unit 4. The control unit 4 then regulates the control pressure and the control pressure outlet P22 based on the received measured control pressure value signal. Specifically, the third regulating valve 9, that is to say the inlet valve, is opened and connected pneumatically to the supply pressure inlet P11. As a result, pneumatic pressure is applied to the pressure valve 11 and it switches so that the control pressure outlet P22 is aerated.

The control pressure is set to the level of the pressure medium supply pressure by the third regulating valve 9, that is to say the inlet valve, and the control pressure is lowered, when required, by the second regulating valve 8 and the first regulating valve 7. In this context, the actual pressure sensor 12 continuously registers the actual control pressure at the control pressure outlet P22 and transmits the corresponding measurement signal as a control parameter to the electronic control unit 4.

The setpoint pressure sensor 3 normally measures the actual setpoint control pressure very precisely such that the control unit 4 sets the correct and desired control pressure for application to the brake system of the trailer 5. However, if the setpoint pressure sensor 3 transmits an incorrect signal owing to a fault, the control unit 4 will thus set an incorrect control pressure. In order to detect such a fault, a method according to the invention is carried out in which the valve and sensor device 2 (trailer control valve) is switched into a redundancy mode.

Figure 3:
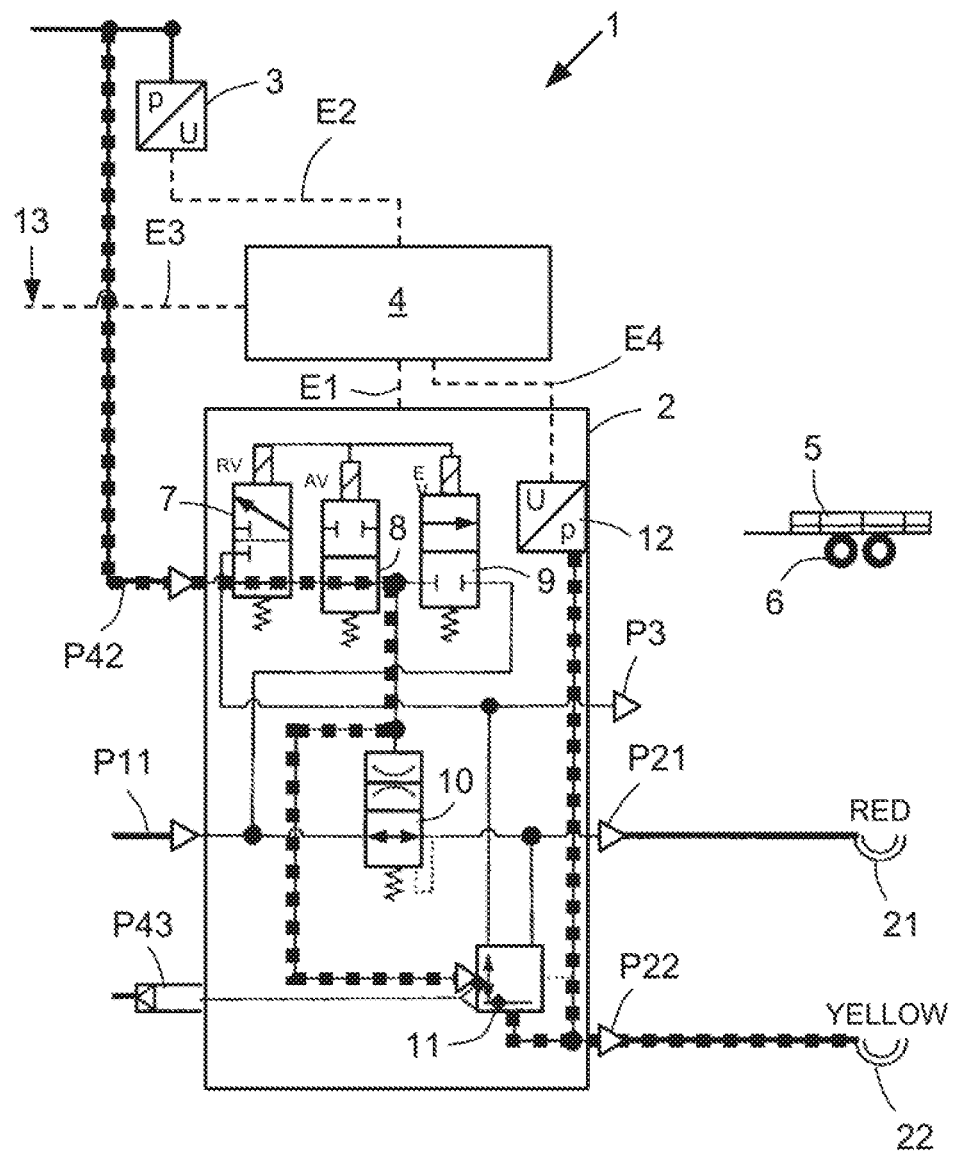
FIG. 3 shows the switching diagram according to FIG. 1 with a control pressure path in a redundancy mode.

FIG. 3 shows the valve and sensor device 2 (trailer control valve) in this redundancy mode. The pneumatic ports and connections to which the pneumatic pressure medium is applied in this operating mode are again illustrated in a highlighted fashion in the drawing. In the redundancy mode, the electronic control unit 4 is in a passive operating mode; there is therefore no active pressure regulation. All three regulating valves 7, 8, 9 are accordingly switched to the currentless state. The braking request pressure, which prevails at the first control pressure inlet P42, is conducted directly into the valve and sensor device 2. This setpoint control pressure switches the pressure valve 11 into its open position. Accordingly, the setpoint control pressure is also directly present at the control pressure outlet P22 of the valve and sensor device 2, so that it is measured as an actual control pressure by the actual pressure sensor 12.

In order to test the satisfactory functioning of the setpoint pressure sensor 3, the brake system 1 is switched, in response to predetermined specific operating states of the vehicle, into the described redundancy mode. The actual pressure sensor 12 monitors the actual control pressure in the redundancy mode at the control pressure outlet P22. If under these defined conditions, a measured setpoint control pressure value, which is not plausible for the conditions, is transmitted by the setpoint pressure sensor 3, the control unit 4 detects a malfunction of the setpoint pressure sensor 3, stores it as an event, and indicates this malfunction in a suitable way.

To summarize, the actual pressure sensor 12 is used as a redundancy sensor in order to subject the setpoint pressure sensor 3 to plausibility checking and, as a result, ensure a high safety integrity level of the electronic pressure controller in the brake system 1. Finally, the invention is not limited to the aforementioned example of a valve and sensor device 2, which is a trailer control valve, but can be applied to all comparably constructed valve and sensor devices within electronic brake systems.

While the above description constitutes the preferred embodiments of the present invention, it will be appreciated that the invention is susceptible to modification, variation and change without departing from the proper scope and fair meaning of the accompanying claims.

The invention claimed is:

1. A method for functionally testing a pressure-medium-operated electronic brake system of a vehicle with a valve and sensor device having:
    at least one control pressure inlet and at least one control pressure outlet;
    a plurality of valves selected from electrically activated inlet valves, outlet valves, redundancy valves, and pressure valves;
    an at least one actual pressure sensor configured to measure an actual control pressure and transmit an actual control pressure signal;
    an at least one setpoint pressure sensor configured to measure a setpoint control pressure and transmit a setpoint control pressure signal;
    an electronic control unit configured to receive pressure signals and to actuate the plurality of valves, the electronic control unit having a signal-conducting connection to:
        the electrically activated valves;
        the at least one actual pressure sensor; and
        the at least one setpoint pressure sensor;
    wherein:
        the valve and sensor device has a normal operating mode in which the electronic control unit is configured to actively regulate the actual control pressure at the control pressure outlet via the setpoint control pressure;
        the valve and sensor device has a redundancy mode in which the electronic control unit is in a passive operating mode wherein the actual control pressure present at the control pressure outlet is generated directly by the setpoint control pressure present at the control pressure inlet;
    the method comprising:
        switching the valve and sensor device into the redundancy mode;
        measuring the setpoint control pressure provided at the control pressure inlet of the valve and sensor device via the setpoint pressure sensor;
        transmitting the setpoint control pressure as an input signal to the electronic control unit,
        measuring the actual control pressure provided at the control pressure outlet;
        transmitting the actual control pressure as an input signal to the electronic control unit;
        performing a comparative plausibility check of the actual control pressure and the setpoint control pressure via the electronic control unit;
        detecting a malfunction of the setpoint pressure sensor via a result of the comparative plausibility check; and
        storing or outputting a fault message.

2. The method of claim 1, wherein switching the valve and sensor device into the redundancy mode is carried out when the vehicle is in a predetermined specific operating state.

3. The method of claim 2, wherein the predetermined specific operating state is a "vehicle stationary state" operating state or a "first braking process after starting" operating state.

4. The method of claim 2, comprising determining the predetermined specific operating state using an operational parameter of the vehicle, wherein the operational parameter is provided by a bus system of the vehicle.

5. The method of claim 4, wherein the operational parameter of the vehicle is selected from a speed of the vehicle, a wheel speed of the vehicle, a longitudinal acceleration of the vehicle, and an operating state of an immobilizing brake.

6. The method of claim 1, wherein the method is carried out on a valve and sensor device configured to actuate a service brake system of the vehicle.

7. The method of claim 1, wherein the method is carried out on a valve and sensor device configured to actuate an immobilizing brake system of the vehicle.

8. The method of claim 1, wherein the method is carried out on an electronic trailer control valve configured to actuate a trailer brake system of a trailer vehicle, wherein the pressure control inlet is a redundancy pressure inlet and the control pressure outlet is connected to a control pressure coupling head configured to couple a brake line of the trailer vehicle to the control pressure outlet.

9. A utility vehicle selected from a single vehicle or a tractor vehicle-trailer vehicle combination having an electronic brake system with a valve and sensor device configured to be compatible with the method of claim 1.

10. A method for functionally testing a pressure-medium-operated electronic brake system of a vehicle, the brake system having:
    a valve and sensor device comprising:
        at least one pneumatic control pressure inlet and at least one pneumatic control pressure outlet;
        a plurality of valves selected from electrically activated inlet valves, outlet valves, redundancy valves, and pressure valves;
        an at least one actual pneumatic pressure sensor within the valve and sensor device configured to measure an actual pneumatic control pressure present at the at least one pneumatic control pressure outlet and to transmit an actual control pressure signal;
        an electronic control unit configured to receive pressure signals and to actuate the plurality of valves of the valve and sensor device, an at least one setpoint pressure sensor configured to measure a pneumatic setpoint control pressure in a pressure line connected to the at least one pneumatic control pressure inlet of the valve and sensor device and to transmit a setpoint control pressure signal to the electronic control unit;

wherein the electronic control unit has a signal-conducting connection to:
 the electrically activated valves of the valve and sensor device;
 the at least one actual pneumatic pressure sensor of the valve and sensor device; and
 the at least one pneumatic setpoint pressure sensor;

wherein:
 the valve and sensor device has a normal operating mode in which the electronic control unit is configured to actively regulate the actual pneumatic control pressure at the pneumatic control pressure outlet via the pneumatic setpoint control pressure;
 the valve and sensor device has a redundancy mode in which the electronic control unit is in a passive operating mode wherein the actual pneumatic control pressure present at the pneumatic control pressure outlet is generated directly by the pneumatic setpoint control pressure present at the pneumatic control pressure inlet;

the method comprising:
 switching the valve and sensor device into the redundancy mode;
 measuring the pneumatic setpoint control pressure provided at the pneumatic control pressure inlet of the valve and sensor device via the pneumatic setpoint pressure sensor;
 transmitting the pneumatic setpoint control pressure as an input signal to the electronic control unit,
 measuring the actual pneumatic control pressure provided at the pneumatic control pressure outlet;
 transmitting the actual pneumatic control pressure as an input signal to the electronic control unit;
 performing a comparative plausibility check of the actual pneumatic control pressure and the setpoint pneumatic control pressure via the electronic control unit;
 detecting a malfunction of the pneumatic setpoint pressure sensor via a result of the comparative plausibility check; and
 storing or outputting a fault message.

11. A method for functionally testing a pressure-medium-operated electronic brake system of a vehicle with a valve and sensor device having:
 at least one control pressure inlet and at least one control pressure outlet;
 a plurality of valves selected from electrically activated inlet valves, outlet valves, redundancy valves, and pressure valves;
 an at least one actual pressure sensor configured to measure an actual control pressure at the at least one control pressure outlet and to transmit an actual control pressure signal;
 an at least one setpoint pressure sensor configured to measure a setpoint control pressure and transmit a setpoint control pressure signal;
 an electronic control unit configured to receive pressure signals and to actuate the plurality of valves, the electronic control unit having a signal-conducting connection to:
  the electrically activated valves;
  the at least one actual pressure sensor; and
  the at least one setpoint pressure sensor;
 wherein the valve and sensor device has a normal operating mode in which the electronic control unit is configured to actively regulate the actual control pressure at the control pressure outlet via the setpoint control pressure;
 wherein the valve and sensor device has a redundancy mode in which the electronic control unit is in a passive operating mode wherein the actual control pressure present at the control pressure outlet is generated directly by the setpoint control pressure present at the control pressure inlet;

the method comprising:
 switching the valve and sensor device into the redundancy mode;
 wherein switching the valve and sensor device into the redundancy mode is carried out when the vehicle is in a predetermined specific operating state;
 wherein the predetermined specific operating state is one of a plurality of predetermined specific operating states, the plurality of predetermined specific operating states including both a "vehicle stationary state" operating state and a "first braking process after starting" operating state;
 measuring the setpoint control pressure provided at the control pressure inlet of the valve and sensor device via the setpoint pressure sensor;
 transmitting the setpoint control pressure as an input signal to the electronic control unit,
 measuring the actual control pressure provided at the control pressure outlet;
 transmitting the actual control pressure as an input signal to the electronic control unit;
 performing a comparative plausibility check of the actual control pressure and the setpoint control pressure via the electronic control unit;
 detecting a malfunction of the setpoint pressure sensor via a result of the comparative plausibility check; and
 storing or outputting a fault message.

* * * * *

UNITED STATES PATENT AND TRADEMARK OFFICE
CERTIFICATE OF CORRECTION

PATENT NO. : 11,565,681 B2
APPLICATION NO. : 16/674331
DATED : January 31, 2023
INVENTOR(S) : Dominika Dombek et al.

It is certified that error appears in the above-identified patent and that said Letters Patent is hereby corrected as shown below:

On the Title Page

Item (73) ASSIGNEE should read:
ZF CV Systems Europe BV

Signed and Sealed this
Twentieth Day of August, 2024

Katherine Kelly Vidal
*Director of the United States Patent and Trademark Office*